US007353455B2

(12) United States Patent
Malik (10) Patent No.: US 7,353,455 B2
(45) Date of Patent: Apr. 1, 2008

(54) CALLER INITIATED DISTINCTIVE PRESENCE ALERTING AND AUTO-RESPONSE MESSAGING

(75) Inventor: Dale W. Malik, Dunwoody, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 10/223,859

(22) Filed: Aug. 19, 2002

(65) Prior Publication Data
US 2003/0218631 A1 Nov. 27, 2003

Related U.S. Application Data

(60) Provisional application No. 60/382,106, filed on May 21, 2002.

(51) Int. Cl.
*G06F 3/00* (2006.01)

(52) U.S. Cl. ...................... 715/758; 715/753

(58) Field of Classification Search ................ 345/734, 345/751, 758, 752, 733, 853, 753; 709/224, 709/223
See application file for complete search history.

(56) References Cited

U.S. PATENT DOCUMENTS

| | | | |
|---|---|---|---|
| 5,675,733 A | | 10/1997 | Williams |
| 5,720,771 A | * | 2/1998 | Snell ............................ 607/60 |
| 5,793,365 A | * | 8/1998 | Tang et al. .................. 345/758 |
| 5,796,393 A | * | 8/1998 | MacNaughton et al. ..... 345/733 |
| 5,812,639 A | | 9/1998 | Bartholomew et al. |
| 5,926,179 A | * | 7/1999 | Matsuda et al. ............. 345/752 |
| 6,047,327 A | | 4/2000 | Tso et al. |
| 6,058,420 A | * | 5/2000 | Davies ........................ 709/224 |
| 6,108,709 A | | 8/2000 | Shinomura et al. |
| 6,151,507 A | | 11/2000 | Laiho et al. |
| 6,286,033 B1 | | 9/2001 | Kishinsky et al. |
| 6,301,609 B1 | | 10/2001 | Aravamudan et al. |
| 6,425,006 B1 | * | 7/2002 | Chari et al. ................. 709/224 |
| 6,553,416 B1 | * | 4/2003 | Chari et al. ................. 709/224 |
| 6,584,494 B1 | * | 6/2003 | Manabe et al. .............. 715/733 |

(Continued)

FOREIGN PATENT DOCUMENTS

| WO | WO 03/098449 | 11/2003 |
|---|---|---|
| WO | WO 03/100637 | 12/2003 |

OTHER PUBLICATIONS

Definition of "Ack", Newton's Telecom Dictionary, CMP books, 20th Edition, p. 42, Feb. 1, 2004.

(Continued)

*Primary Examiner*—Weilun Lo
*Assistant Examiner*—Truc T. Chuong
(74) *Attorney, Agent, or Firm*—Thomas, Kayden, Horstemeyer & Risley, LLP (57) ABSTRACT

One preferred embodiment of the present invention provides a system and methods for relaying presence information of a first user to a second user. Briefly described, in architecture, one embodiment of the system, among others includes, can be implemented as follows. A first communications client of a first user detects a change in the presence status of a first user and sends an alert message to a second communications client of a second user. Methods and other systems are also provided.

21 Claims, 5 Drawing Sheets

U.S. PATENT DOCUMENTS

| | | | | |
|---|---|---|---|---|
| 6,591,094 | B1* | 7/2003 | Bentley | 455/405 |
| 6,658,095 | B1 | 12/2003 | Yoakum et al. | |
| 6,668,169 | B2* | 12/2003 | Burgan et al. | 709/219 |
| 6,727,811 | B1* | 4/2004 | Fendis | 340/506 |
| 6,731,308 | B1* | 5/2004 | Tang et al. | 715/751 |
| 6,757,365 | B1 | 6/2004 | Bogard | |
| 6,816,578 | B1 | 11/2004 | Kredo et al. | |
| 6,944,555 | B2 | 9/2005 | Blackett et al. | |
| 6,954,136 | B2* | 10/2005 | Sauer | 340/7.46 |
| 6,965,935 | B2* | 11/2005 | Diong | 709/224 |
| 6,987,840 | B1 | 1/2006 | Bosik et al. | |
| 6,993,327 | B2 | 1/2006 | Mathis | |
| 7,043,530 | B2 | 5/2006 | Isaacs et al. | |
| 7,058,036 | B1 | 6/2006 | Yu et al. | |
| 2002/0026483 | A1* | 2/2002 | Isaacs et al. | 345/751 |
| 2002/0032740 | A1 | 3/2002 | Stern et al. | |
| 2002/0035605 | A1 | 3/2002 | McDowell et al. | |
| 2002/0046299 | A1* | 4/2002 | Lefeber et al. | 709/318 |
| 2002/0160757 | A1* | 10/2002 | Shavit et al. | 455/414 |
| 2003/0018903 | A1* | 1/2003 | Greca et al. | 713/188 |
| 2004/0171396 | A1 | 9/2004 | Carey et al. | |

OTHER PUBLICATIONS

Koch; U.S. Appl. No. 09/709,038 filed Nov. 10, 2000 (Note: Copy not provided as it is part of PTO records).
Adamczyk; U.S. Appl. No. 10/745,199 filed Dec. 23, 2003 (Note: Copy not provided as it is part of PTO records).
Malik; U.S. Appl. No. 10/889,741 filed Jul. 13, 2004 (Note: Copy not provided as it is part of PTO records).
Daigle; U.S. Appl. No. 11/304,319 filed Dec. 15, 2005 (Note: Copy not provided as it is part of PTO records).
Holt; U.S. Appl. No. 10/144,425 filed May 13, 2002 (Note: Copy not provided as it is part of PTO records).
Malik; U.S. Appl. No. 10/985,361 filed Nov. 10, 2004 (Note: Copy not provided as it is part of PTO records).
Malik; Non-Final Rejection mailed Jun. 5, 2006; for U.S. Appl. No. 10/985,361, filed Nov. 10, 2004 (Note: Copy not provided as it is part of PTO records).
Malik; Final Rejection mailed Dec. 5, 2006; for U.S. Appl. No. 10/985,361, filed Nov. 10, 2004 (Note: Copy not provided as it is part of PTO records).
Malik; Advisory Action mailed Feb. 28, 2007; for U.S. Appl. No. 10/985,361, filed Nov. 10, 2004 (Note: Copy not provided as it is part of PTO records).
Malik; Non-Final Rejection mailed Jun. 19, 2007; for U.S. Appl. No. 10/985,361, filed Nov. 10, 2004 (Note: Copy not provided as it is part of PTO records).
Holt; Non-Final Rejection mailed Aug. 25, 2005; for U.S. Appl. No. 10/144,425 filed May 13, 2002 (Note: Copy not provided as it is part of PTO records).
Holt; Final Rejection mailed Feb. 27, 2006; for U.S. Appl. No. 10/144,425 filed May 13, 2002 (Note: Copy not provided as it is part of PTO records).
Holt; Non-Final Rejection mailed Jul. 14, 2006; for U.S. Appl. No. 10/144,425 filed May 13, 2002 (Note: Copy not provided as it is part of PTO records).
Holt; Non-Final Rejection mailed Jan. 3, 2007; for U.S. Appl. No. 10/144,425 filed May 13, 2002 (Note: Copy not provided as it is part of PTO records).
Holt; Final Rejection mailed Jun. 19, 2007; for U.S. Appl. No. 10/144,425 filed May 13, 2002 (Note: Copy not provided as it is part of PTO records).
Koch; Non-Final Rejection mailed Mar. 3, 2004; for U.S. Appl. No. 09/709,038 filed Nov. 10, 2000 (Note: Copy not provided as it is part of PTO records).
Koch; Final Rejection mailed Sep. 2, 2004; for U.S. Appl. No. 09/709,038 filed Nov. 10, 2000 (Note: Copy not provided as it is part of PTO records).
Koch; Non-Final Rejection mailed Jan. 26, 2005; for U.S. Appl. No. 09/709,038 filed Nov. 10, 2000 (Note: Copy not provided as it is part of PTO records).
Koch; Final Rejection mailed Aug. 12, 2005; for U.S. Appl. No. 09/709,038 filed Nov. 10, 2000 (Note: Copy not provided as it is part of PTO records).
Koch; Non-Final Rejection mailed Apr. 28, 2006; for U.S. Appl. No. 09/709,038 filed Nov. 10, 2000 (Note: Copy not provided as it is part of PTO records).
Koch; Non-Final Rejection mailed Jan. 16, 2007; for U.S. Appl. No. 09/709,038 filed Nov. 10, 2000 (Note: Copy not provided as it is part of PTO records).
Koch; Examiner Interview Summary Record mailed Apr. 16, 2007; for U.S. Appl. No. 09/709,038 filed Nov. 10, 2000 (Note: Copy not provided as it is part of PTO records).
Koch; Final Rejection mailed Jul. 6, 2007; for U.S. Appl. No. 09/709,038 filed Nov. 10, 2000 (Note: Copy not provided as it is part of PTO records).
Koch; Notice of appeal filed mailed Oct. 5, 2007; for U.S. Appl. No. 09/709,038 filed Nov. 10, 2000 (Note: Copy not provided as it is part of PTO records).
International Search Report mailed Sep. 12, 2003, for PCT/US03/15814.
International Search Report mailed Jul. 31, 2003, for PCT/US03/14671.

* cited by examiner

CALLER INITIATED DISTINCTIVE PRESENCE ALERTING AND AUTO-RESPONSE MESSAGING

CROSS-REFERENCE TO RELATED APPLICATION

This application claims priority to copending U.S. provisional application entitled, "Integration of Instant Messaging and Computer Operating Systems," having Ser. No. 60/382,106, filed May, 21, 2002, which is entirely incorporated herein by reference.

TECHNICAL FIELD

The present invention is generally related to communications and, more particularly, is related to a system and method for relaying a user's presence over a communication network.

BACKGROUND OF THE INVENTION

Presence and availability are terms used to describe a present ability of an individual to communicate. Presence is an ability of an individual to communicate in real time, and availability is the willingness of an individual to communicate in real time. In communications, it is advantageous to know whether a potential recipient of a communication message is present and available, i.e., available to receive and respond to the message before initiating the transmission of the message. By making the presence and availability of individual users known before any communication is attempted, a realtime communications environment is facilitated that is more effective and less obtrusive than conventional communication mediums. Clearly, the communication message that is sent to an addressee that is known to be present and available is more likely to be received promptly than a conventional message. For example, often times, conventional telephone calls are forwarded to a person's voicemail and are never returned.

Instant messaging (IM) is one communication medium that employs presence and availability technology. An instant messaging network recognizes when a user is "present" on the network. Accordingly, the network sends notification to other users (usually members of a "buddy list" or "contact list") that are also logged on the network that the user is "present." Further, instant messaging lets a user display custom status messages to his "buddies" online about the user's "availability." For example, a user can specify his availability status as being "busy, not taking messages." Therefore another user on the "buddy list" that is connected to the instant messaging network will be notified that although the user is present on the network, he is not available for receiving messages. Presence and availability information is most useful when an individual shares his or her online status with a trusted group of users. A communication message sent to someone who is readily present and available is less obtrusive, when the addressee has made himself or herself available to the communication.

Figure 1:
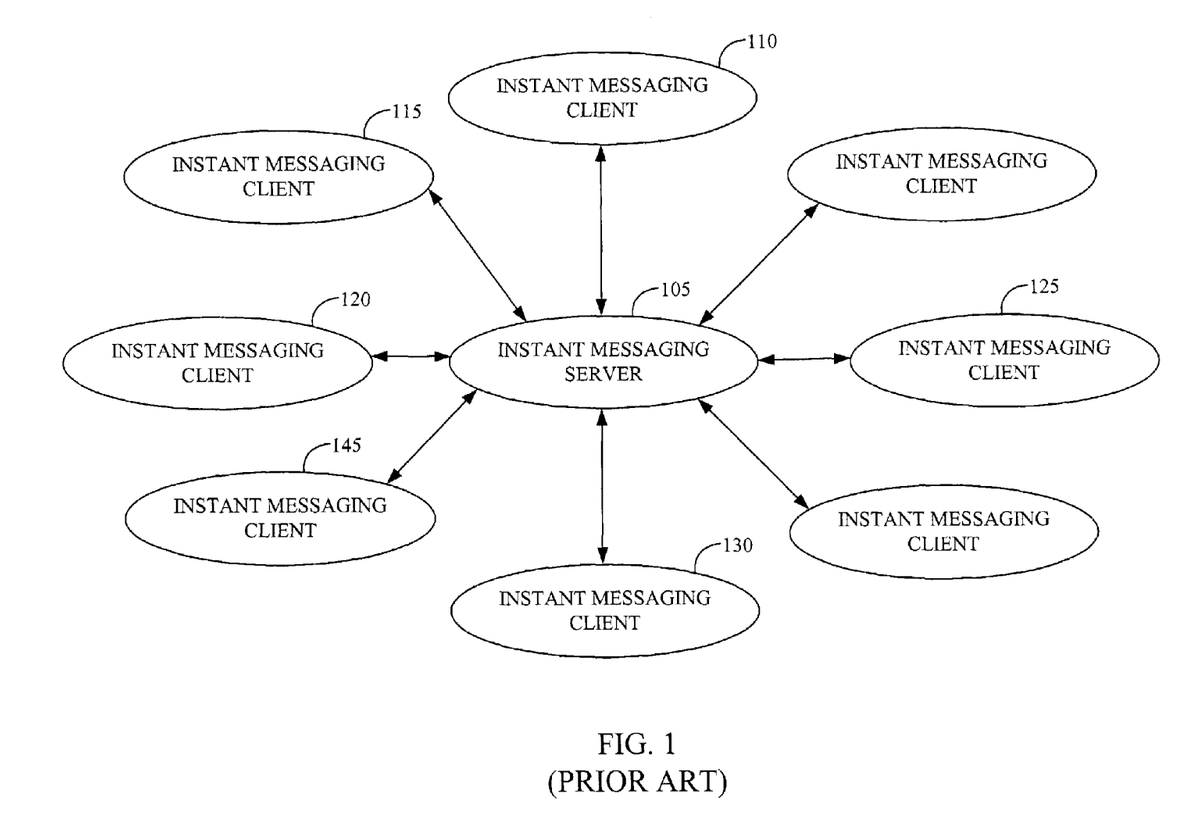
FIG. 1 is a block diagram of an closed instant messaging system of the prior art.

An example of a traditional "closed" instant messaging (IM) architecture is shown in FIG. 1. The traditional IM architecture consists of a central IM server 105 connected to a number of individual clients (110, 115, 120, 125, 130, and 145) in a closed network. To send an instant message, from client 110 to client 145, IM client 110 first connects with an IM server 105 using a proprietary protocol. For example, AOL® and Yahoo!® use ICQ. Once the IM client 110 is connected to the IM server 105, the user logs on by entering a user name and password. The IM client 110 then sends the IM server 105 the connection information, such as the IP address and the number of the port assigned to the IM client and the name and IP address of everyone in the IM contact list associated with the IM client 110.

The IM server 105 then creates a temporary file that contains the connection information for the IM client 110 and for each IM client 115, 120, 145. Once the temporary files have been created, the IM server 105 checks the network to determine whether any IM client identified by the contact list associated with IM client 110 is currently logged into the system. If the IM server 105 finds any of the contacts logged onto the network, the IM server 105 sends a message back to the IM client 110 with the connection information for each IM client 115, 120, 145 currently logged onto the network. When the IM client 110 receives the connection information, the status of that particular IM client 115, 120, 145 is updated to "Online," which is displayed to the user. At this point the user may select any IM client 115, 120, 145 that is registered "Online," at which point a dialog box will appear in which the user may enter text. Because the IM client 110 knows the address and port number of the IM client 145, the message is sent directly to the recipient IM client 145. The IM client 145 then receives the instant message and can respond. Once the IM session is complete the dialog box is closed and the IM client 110 goes offline and sends a message to the IM server 105 terminating the session. The IM server 105, in response to acknowledging that the IM client 110 has logged off, generates a message to each of the IM clients 115, 120, 145 on the client list of IM client 110 indicating that IM client 110 is logged off the network.

An example of an "open" instant messaging architecture is Jabber, available from Jabber, Inc. of Denver, Co., which includes an IM system focusing on providing IM access to many types of users from many different locations using many devices and interoperability with IM services. Jabber includes an Extensible Markup Language (XML) open source server software that was developed by a community of developers over the Internet. Jabber allows communication among applications and systems across many platforms. Developers write additional modules to submit them back for possible incorporation into the Jabber software.

Figure 2:
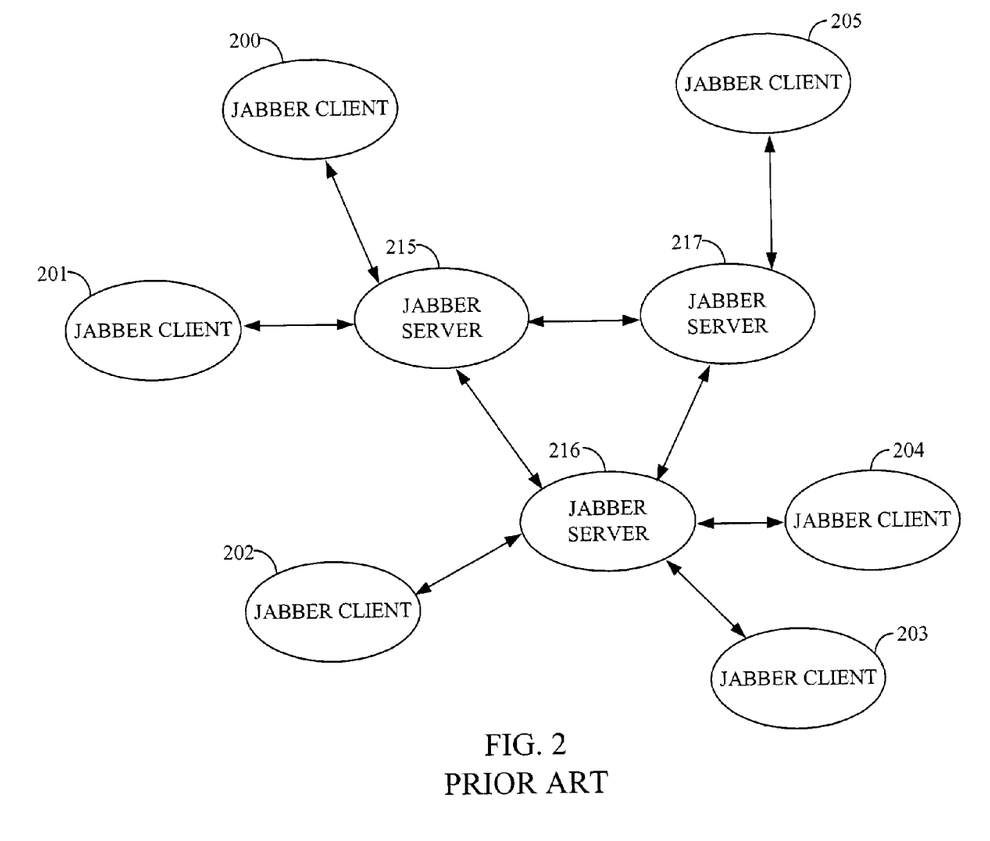
FIG. 2 is a block diagram of a open instant messaging system of the prior art.

A block diagram illustrating a prior art IM network that uses Jabber interoperable XML-based network architecture is shown in FIG. 2. Jabber is a real-time communications platform based on open protocols and Extensive Markup Language (XML) and whose architecture is based on the well-known electronic mail system. Because Jabber is based on the email system, the Jabber architecture contains distributed network servers, called Jabber servers 215-217 and clients, known as Jabber clients 200-205 that receive and send messages to Jabber clients 200-205 connected to any Jabber server 215-217 on the Internet. However, unlike typical email systems, which are store and forward systems, Jabber delivers messages in real time because the Jabber server 215-217 knows when a particular Jabber client 200-205 is online.

The Jabber architecture is based on client-server architecture and not on a client-to-client architecture, as are most IM systems. Messages from Jabber client 200 to Jabber client 201 must pass through the Jabber server 215. Each Jabber client 200-205 is attached to a local Jabber server 215-217. Each local Jabber server 215-217 receives information from one Jabber client 200-205 and transfers the information to another Jabber client 200-205 along with presence information. Each local Jabber server 215-217 functions independently from one another, and can communicate with any other Jabber server 215-217 that is connected to the Internet as long as it has been identified, and predisposed to do so ahead of time. Each local Jabber server 215-217 performs two functions: listening for and communicating directly with Jabber client applications 200-205, and communicating with other Jabber servers 215-217. Each local Jabber server 215-217 consists of multiple components that separately handle individual functions with the Jabber system.

One way that a user can be notified to the online presence or availability of another user through instant messaging is to set up an auditory alert mechanism or "buddy alert." Typically, a user via an IM client will set parameters consisting of the people that the user wants to monitor and what sound the user wants his or her instant messaging client to play when the presence or availability status of a monitored user changes. For example, a user, Dale, may want to be notified when his friend, Lee, is connected to the instant messaging network. Therefore, Dale may designate parameters in his contact list that an auditory alert should be played on Dale's instant messaging client when Lee comes online. In the parameters, Dale can also assign a unique sound to this "buddy" by associating a particular audio file to this alarm request. Accordingly, Dale could assign a particular auditory alert to be played for each "buddy" he monitors. Therefore, when Lee connects to the instant messaging network, an auditory alert will play on Dale's client to notify him of Lee's online presence.

Today's instant messaging services mostly focus on the generation of auditory alerts for a user who is monitoring presence status changes initiated by persons named in the contact list of the user. The monitoring user designates the type of auditory alert played and under what conditions, the auditory alert is played. However, this method is not flexible for the user being monitored. Thus, a heretofore unaddressed need exists in the industry to address the aforementioned deficiencies and inadequacies.

SUMMARY OF THE INVENTION

Preferred embodiments of the present invention provide systems and methods for relaying presence information of a first user to a second user. Briefly described, in architecture, one embodiment of the system, among others, can be implemented as follows. A first communications client of a first user detects a change in the presence status of a first user and sends an alert message to a second communications client of a second user.

The present invention can also be viewed as providing methods for relaying presence information of a first user to a second user. In this regard, one embodiment of such a method, among others, can be broadly summarized by the following steps: p detecting a change in the presence status of a first user and sending an alert message to a second user.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 3:
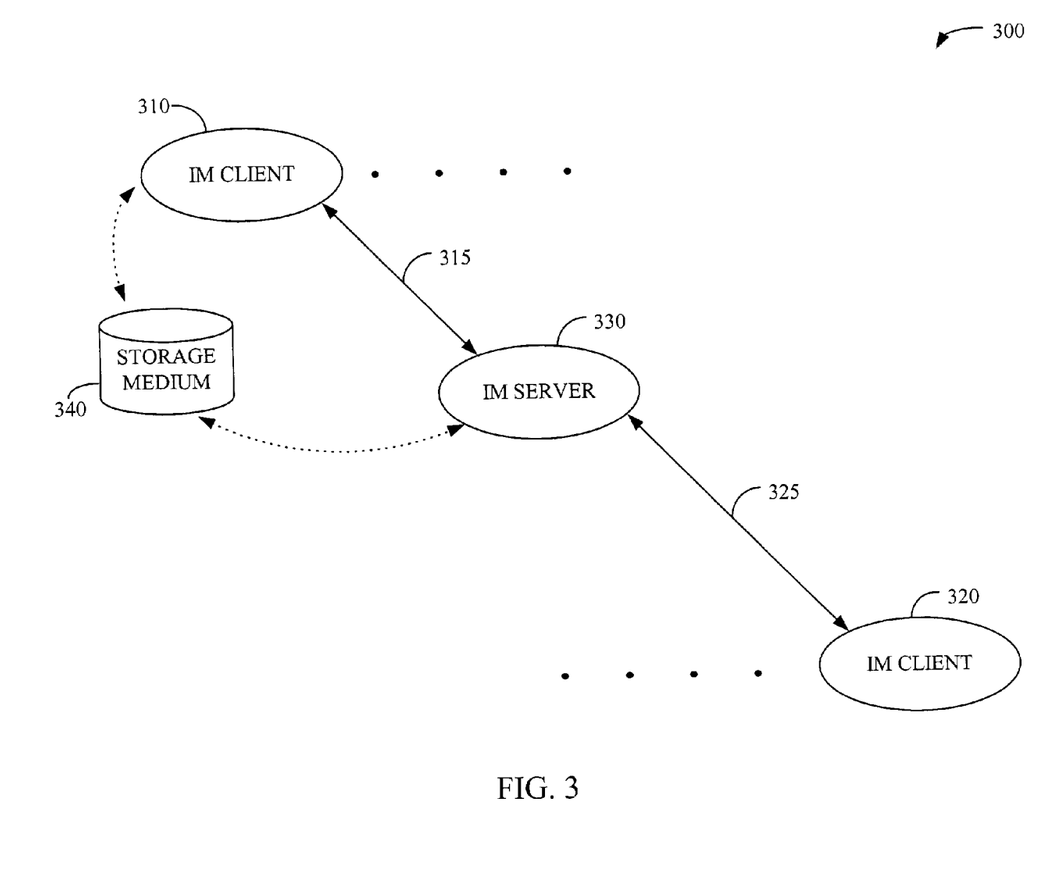
FIG. 3 is a block diagram of a caller initiated alert system for one preferred embodiment of the present invention.

Depicted in FIG. 3 is a representative embodiment, among others, of a caller initiated alert system 300 of the present invention. The caller initiated alert system 300 includes an instant messaging (IM) client 310 of a first user, wherein the IM client 310 is adapted to transmit an alert message when a particular presence status change occurs with regard to the first user. The system also includes an IM client 320 of a second user, wherein the client 320 is adapted to receive and play the alert messages it receives from other users, such as the first user. As described in greater detail hereinafter, the IM client 310 of the first user acquires objective information that is relevant to determining when to send an alert message.

Each IM client 310, 320 communicates with and receives presence status information from an IM server 330. The IM server 330 may be, among others, a single IM server 105 of FIG. 1 or a local IM server, such as a Jabber Server 215 of FIG. 2. The IM server 330 monitors the presence information of the IM client 310 of the first user and notifies the IM client 310 of the presence status information of other IM clients 320 and their associated users. Accordingly, a user sets contact parameters on the type of presence information that the user wants to receive from the IM server 330.

For instance, the first user may designate the contact parameters in a contact list (or buddy list), for example. Within the contact parameters, the first user names the second user as a person that the first user wants to monitor. The contact parameters in the contact list are then stored in a storage medium 340 that is accessible by the IM client 310 of the first user or the IM server 330. Other information may also be contained in the contact parameters such as the instant messaging addresses of the people identified in the contact list.

In a closed system (FIG. 1), the contact parameters are typically stored in a storage medium 340 that is accessible by the IM client 310, 320, such as an internal disk drive of a general purpose computer or the memory of a mobile device, and a copy of the contact parameters is given to the IM server 330.

In an open system (FIG. 2), the contact parameters are typically stored in a storage medium 340 accessible by the IM server 330, such as an internal disk drive or a separate storage medium, such as a database. The IM server 330 then forwards a copy of the contact parameters to the IM client 310. From the contact parameters, the IM client 310 identifies the people about which the first user wants to receive presence status information.

In one preferred embodiment of the invention, contact parameters are set by an initiator of an instant message, such as the first user, so that an alert message is sent to other users, such as the second user, whenever a particular change in the presence status occurs with respect to the first user. Rather than an IM client 320 of the second user detecting a change in the presence status of the first user and playing an auditory alert designated by the second user, the IM client 310 of the first user sends an instant "alert" message to the second user, wherein the alert message includes an attached audio file that is designated by the first party. If the second user is present and available, the alert message is sent to and received at the IM client 320 of the second user. The IM client 320 of the second user then recognizes the alert message and plays the attached audio file, without starting a chat session. Therefore, an initiator of an instant message, such as the first user, can deliver an auditory alert or audio clip of his or her choosing when the first user wants to make his or her change in presence known to another user, such as the second user. Accordingly, the IM client 310 of the first user and the IM client 320 of the second user are distinctly different from conventional IM clients of the prior art.

For example, the first user may specify in his or her contact parameters other users to whom he or she wants to send a personal greeting when the presence state of the first user changes, such as from "Offline" to "Online," for example. Accordingly, an alert message containing an audio file of "Hey, I'm Here" could be sent to the second user and received at the IM client 320 of the second user when the first user initially connects to the instant messaging network 315. After the IM client 320 of the second user receives the alert message, the IM client 320 of the second user will play the audio file, "Hey, I'm Here" to announce the online presence of the first user to the second user.

Additionally, the first user could also specify that an auditory recording of the phrase "I'm Headed Home" should be played on the IM client 320 of the second user, when the first user goes offline. Correspondingly, the first user would set contact parameters for an alert message to be sent to the second user, when the presence status of the first user changes from "Online" to "Offline." The first user may also designate in the contact parameters for alert messages to be sent to more than one recipient; for multiple alert messages to be sent to an individual recipient; or for individual alert messages to feature their own distinct audio files. For example, a first user may designate that a particular audio file should be included in an alert message for his or her spouse and a different audio file should be included in an alert message for a particular friend.

Further in some embodiments, the IM client 320 of the second user includes logic capable of detecting that an instant message is an "alert message." Accordingly, the IM client 320 automatically plays the audio file included in the alert message, upon receiving the alert message. Preferably, the IM client 320 is further configured to not initiate a chat session when the IM client plays an audio file from an alert message.

In other embodiments, if the first user requests to be added to the contact list of the second user, and the request is granted, the audio file designated by the first user may be sent to the second user when the first user's instant messaging address is added to the contact list of the second user. Before the audio file is transmitted to the IM client 320 of the second user, the audio file may be stored on a system of the IM client 310 of the first user. Therefore, after successful transmission, the audio file may be pre-stored and accessed locally by the system used by IM client 320 of the second user whenever the presence change of the first user dictates. Accordingly, an audio file would not have to be sent as part of an instant message. Rather, the arrival of an alert message would trigger the playing of the locally stored audio file by the IM client 320 of the second user.

In response to receiving an alert message, the second user may also have the capability to respond via an auto-response window. For example, after receiving and playing an alert message from the first user, the IM client 320 of the second user may automatically present to the second user an informational window containing several short responses. The second user may then select an individual response by clicking on it via a keyboard or mouse input, for example. By selecting a response, the response is sent to the IM client 310 of the first user. Sample responses include "Can't Chat Now," "Talk with You in Five Minutes," "Contact You Later," etc. The responses constitute visual messages that may be displayed to the first user or audio files that may be sent to the first user in corresponding manners that alert messages may be sent to the second user.

In some embodiments, if the second user is connected to his or her instant messaging network 325 but is operating another application, the IM client 320 of the second user may announce the arrival of the alert message by playing a discrete chime or another subtle sound, for example. Alternatively, the IM client 320 may display a small icon to the second user. Accordingly, the IM client 320 of the second user may be in communication with an operating system or other elements of a computing device executing the IM client 320 to determine if other applications are active. Once the second user notices that an alert message has been received via a chime or icon, for example, the second user may then switch to his or her IM client 320 to listen to the message.

Figure 4:
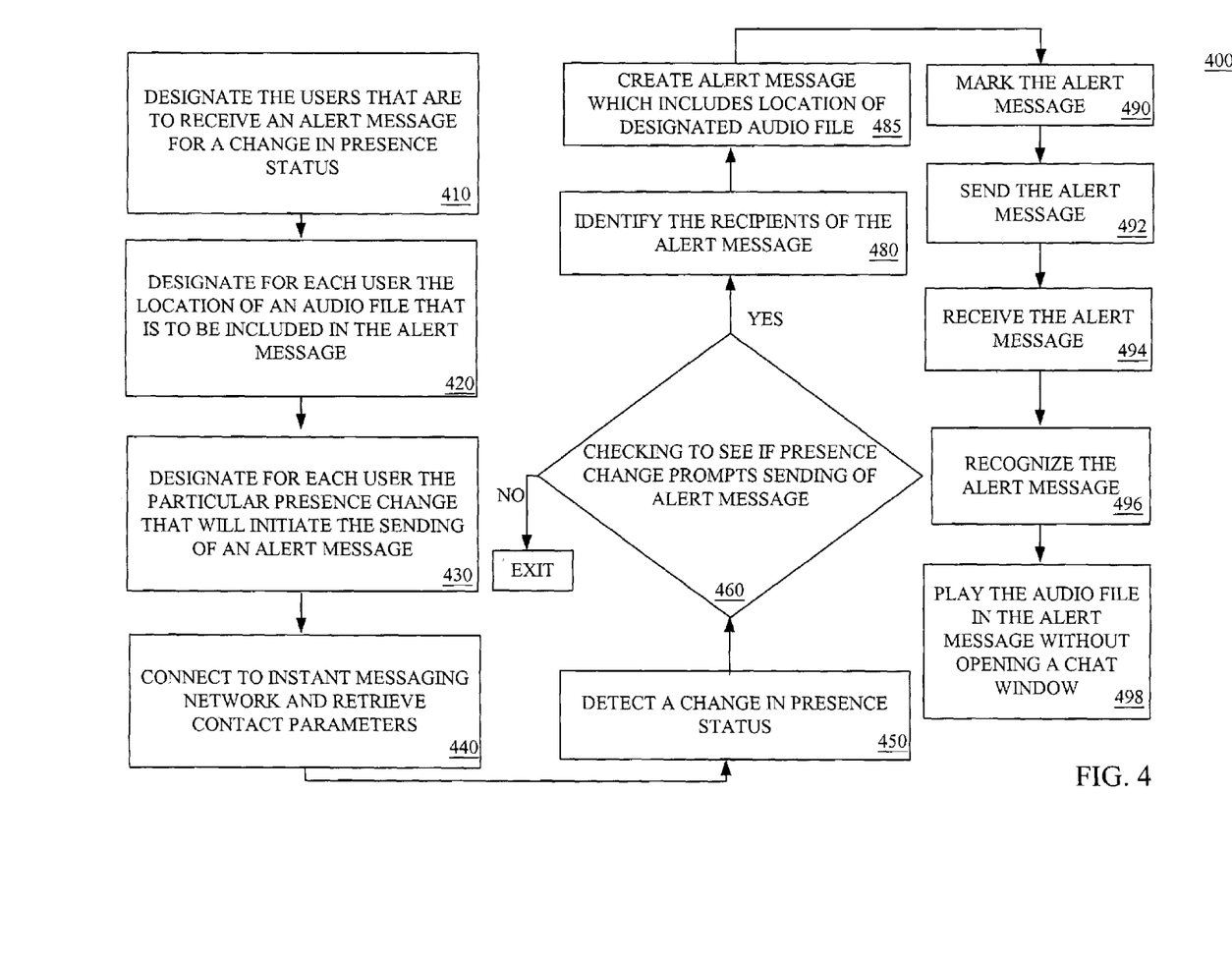
FIG. 4 is a flowchart describing the functionality of a representative embodiment of the caller initiated alert system of FIG. 3.

Since the creation of audio files is a fairly uncomplicated task, an audio file can be easily generated on most computers that act as an IM client. Essentially one needs a microphone and a computer. Alternatively, pre-created audio files are readily available on the Internet and most operating systems, so that a user can readily locate an audio file to use in an alert message. The flowcharts of FIG. 4 show the functionality of a representative implementation of the caller initiated alert system 300 of the present invention. It should also be noted that in some alternative implementations the functions noted in the various blocks may occur out of the order depicted in the flowchart of FIG. 4. For example, two blocks shown in succession in FIG. 4 may, in fact, be executed substantially concurrently. Alternatively, the blocks may sometimes be executed in the reverse order depending upon the functionality involved.

As depicted in FIG. 4, the functionality of a representative embodiment of the caller initiated alert system 300 or method 400 may be construed as beginning at block 410. In block 410, a first user designates in contact parameters the other users that are to receive alert messages for particular presence status change(s) by the first user. For example, the first user may designate that an alert message, containing the auditory message: "Hey, Let's Chat," should be sent to the second user when the first user initially connects to the instant messaging network 315. To make such designations, the first user may utilize user interface screens that could include check boxes, drop down boxes, and text boxes, for example, in association with each user identified in the contact parameters.

Accordingly, in block 420, the first user designates for each user previously identified in the contact parameters, the location of an audio file that is to be included in the alert message for that user. The audio file may be stored locally on the IM client 310 of the first user, in one embodiment. In block 430, the first user also designates for each named user in the contact list, the particular change(s) in the presence status of the first user that will initiate the sending of an alert message to that named user. For example, if the first user designates Adam, Brenda, and Chris in his or her contact parameters as intended recipients of alert messages, the first user may specify that he or she wants an alert message to be sent to Adam only when the first user connects to the instant messaging network 315. However, Brenda may be designated to receive an alert message only when the first user disconnects from the instant messaging network 315. Whereas, Chris may be designated to receive alert messages every time the first user connects or disconnects from the network 315. The first user may also specify a particular change in the availability status of the first user that will initiate the sending of an alert message. For example, the first user may specify that an alert message should be sent when the availability of the first user changes from "Present, but Busy" to "Present and Available" or vice versa.

After the first user has made his or her designations in the contact parameters, the IM client of the first user will retrieve the contact parameters in subsequent initial operations of the IM client to access these designations so that the IM client can determine which users should be sent alert messages. Accordingly, in block 440, the IM client 310 of the first user retrieves the contact parameters of the first user. For a closed system (FIG. 1), the contact parameters are retrieved from a storage medium 340 by the IM client 310. However, in the open system of FIG. 2, the contact parameters are retrieved from a storage medium 340 by the IM server 330. The IM server 330 then forwards a copy of the contact parameters to the IM client 310.

In block 450, the IM client 310 of the first user detects a change in the presence state of the first user. Typically, the IM client 310 of the first user notifies an IM server 330 of the change in presence status of the first user. The IM client 310 then checks the contact parameters to see if anyone is designated to receive an alert message for the detected change in the presence status of the first user, as depicted in block 460. Additionally, the IM client 310 identifies the user that is to be the recipient of the alert message from the contact parameters, as depicted in block 480. For example, for a presence status change of "Offline" to "Online," the first user may have designated in his or her contact parameters that an audio sound file of the phrase, "Hey, Let's Chat," should be sent to the second user.

For each change in the presence status of the first user that the IM client 310 detects, the IM client 310 checks the contact parameters of the first user and determines from the contact parameters whether an alert message should be sent. In the example above, the IM client 310 determines that an alert message containing the audio sequence "Hey, Let's Chat" should be sent to the second user for a change in presence from "Offline" to "Online" for the first user.

In block 485, the IM client 310 creates an alert message which includes the location of the audio file, and the IM client 310 addresses the alert message to the desired recipient(s). The alert message is a standard instant message with an attached audio file, except for the fact that the formatting of the alert message also contains a marker or tag that identifies the message as being an alert message, as shown in block 490. For example, the Jabber instant messaging system is based on XML which incorporates user-defined tags. Tags are not predefined in XML. Thus, one may create a new tag or marker and define the tag or marker to suit one's purposes. Accordingly, in one preferred embodiment of the invention, the IM client 310 of the first user identifies the instant message to be an "alert message" by adding a marker or tag, such as<alert message>, to the instant message XML formatting. The IM client 310 of the first user then sends the message to the intended recipient(s), as depicted in block 492.

Preferably, in one embodiment, to send the alert message in a closed instant messaging system (FIG. 1), an IM client 310 of a first user is provided the IP address for the IM client(s) 320 of the other users identified in the contact parameters of the first user. Therefore, an instant message, such as the alert message, is sent directly from the IM client 310 of the first user to recipient IM client(s) 320, such as the second user.

In another preferred embodiment including an open instant messaging system (FIG. 2), however, the IM client 310 of the first user typically does not have the IP address of the receiving IM client(s) 320 of other users identified in the contact parameters of the first user. Accordingly, the IM client 310 of the first user sends instant messages to a local IM server 330. The IM server 330 retrieves the IP address of the recipient from the storage medium 340 and forwards the instant message to the IP address of the receiving IM client 320 of the recipient, such as the second user.

In block 494, the IM client 320 of the recipient receives the alert message. The IM client 320 of the recipient then recognizes from the marker or tag in the received instant message that the message is an alert message, as depicted in block 596. Accordingly, in block 498, the IM client 320 plays the audio file that is included or attached to the instant message, without opening a chat window. Thus, the recipient at the IM client 320 hears an alert message, such as "Hey, Let's Chat!" from the first user to notify the recipient that the first user is now online. These audio alerts will preferably be in addition to any usual visual change in presence or availability indicators.

Other alternative and preferred embodiments may include additional steps. For example, if the first user requests to be added to the contact list of the second user, and the request is granted, the audio file designated by the first user may be sent to the second user when the first user's instant messaging address is provided to the contact list of the second user. Typically, when the second user agrees to accept another user, such as the first user, onto his or her contact list, the instant messaging nickname or address of the first user is provided to the second user. However, in this alternative embodiment, an audio file designated by the first user is also sent from the IM client 310. Therefore, the audio file may be pre-stored and accessed locally by the system used by IM client 320 of the second user whenever the presence of the first user dictates. Accordingly, an audio file would not have to be sent as part of each alert message. Rather, the arrival of an alert message would trigger the playing of the locally stored audio file by the IM client 320 of the second user.

The IM client 310, 320 of one preferred embodiment of the present invention can be implemented in software, firmware, hardware, or a combination thereof. Preferably, the IM client 310, 320 is implemented in software, as an executable program, and is executed by a special or general purpose digital computer, such as a personal computer, workstation, minicomputer, or mainframe computer. An example of a general purpose computer that can implement the caller initiated alert system of one preferred embodiment of the present invention is shown in FIG. 5.

Figure 5:
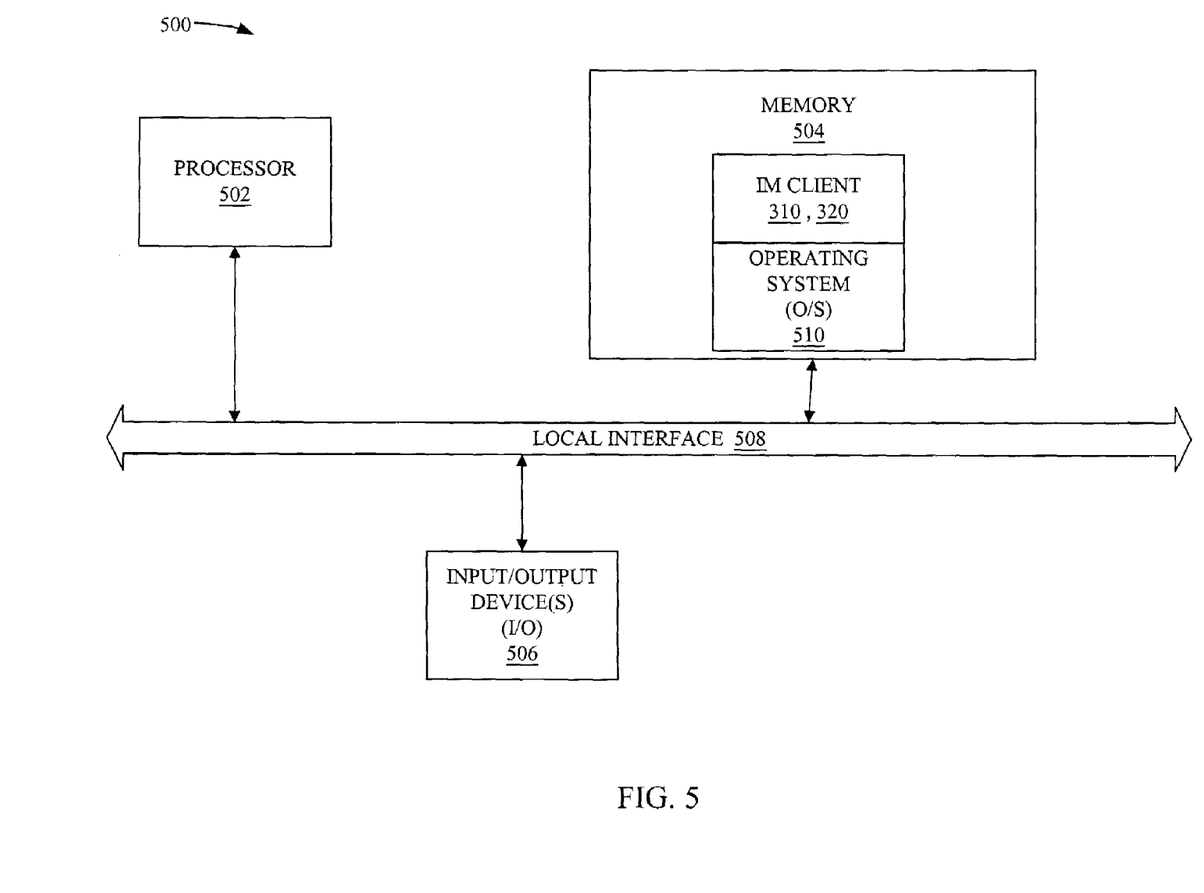
FIG. 5 is a block diagram of one preferred embodiment of the IM client in FIG. 3.

Generally, in terms of hardware architecture, as shown in FIG. 5, the computer 500 includes a processor 502, memory 504, and one or more input and/or output (I/O) devices 506 (or peripherals) that are communicatively coupled via a local interface 508. The local interface 508 can be, for example but not limited to, one or more buses or other wired or wireless connections, as is known in the art. The local interface 508 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 502 may be a hardware device for executing software that can be stored in memory 504. The processor 502 can be any custom made or commercially available processor, a central processing unit (CPU) or an auxiliary processor among several processors associated with the computer 400, and a semiconductor based microprocessor (in the form of a microchip) or a macroprocessor.

The memory 504 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 504 may incorporate electronic, magnetic, optical, and/or other types of storage media. Note that the memory 504 can have a distributed architecture, where various components are situated remote from one another, but can be accessed by the processor 502.

The software in memory 504 may include one or more separate programs, each of which comprises an ordered listing of executable instructions for implementing logical functions. In the example of FIG. 5, the software in the memory 504 includes the IM client 310, 320 and an operating system (O/S) 510. The operating system 510 essentially controls the execution of other computer programs, and provides scheduling, input-output control, file and data management, memory management, and communication control and related services.

The IM client 310, 320 may be a source program, executable program (object code), script, or any other entity comprising a set of instructions to be performed. If the IM client 310, 320 is a source program, then the program needs to be translated via a compiler, assembler, interpreter, or the like, which may or may not be included within the memory 504, so as to operate properly in connection with the O/S 510.

Furthermore, the IM client 310, 320 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 506 may include input devices, for example but not limited to, a keyboard, mouse, scanner, digital camera, multi-function device, digital sender, microphone, etc. Furthermore, the I/O devices 506 may also include output devices, for example but not limited to, a printer, display, etc. Finally, the I/O devices 506 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 500 is a PC, workstation, or the like, the software in the memory 504 may further include a basic input output system (BIOS) (omitted for simplicity). The BIOS is a set of essential software routines that initialize and test hardware at startup, start the O/S 510, and support the transfer of data among the hardware devices. The BIOS is stored in ROM so that the BIOS can be executed when the computer 500 is activated.

When the computer 500 is in operation, the processor 502 is configured to execute software stored within the memory 504, to communicate data to and from the memory 504, and to generally control operations of the computer 500 pursuant to the software. The IM client 310, 320 and the O/S 510, in whole or in part, but typically the latter, are read by the processor 502, perhaps buffered within the processor 502, and then executed.

When the IM client 310, 320 is implemented in software, as is shown in FIG. 4, it should be noted that the IM client 310, 320 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The IM client 310, 320 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the IM client 310, 320 is implemented in hardware, the IM client 310, 320 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, the IM client that receives an alert message may have the capability of blocking the playing of the audio file in the alert message or the displaying of auto-responses. Also, in some embodiments of the caller-initiated alert system, a chat window may be opened along with the playing of the alert message to prompt the recipient to begin a chat session. For example, in addition to a personal computer, the IM client may also include mobile devices, such as, among others, a personal digital assistant, a cellular phone, or a pager. All such modifications and variations are intended to be included herein within the scope of this disclosure and the present invention and protected by the following claims.

Therefore, having thus described the invention, at least the following is claimed:

1. A system for relaying presence information within a electronic chat environment, comprising:
   an electronic chat client configured to detect a network presence change of a user of the electronic chat client and in response to detection of the network presence change, to send at least one presence alert message to at least one contact included in a contact list of the user, the contact list utilized in electronic chat communications by the electronic chat client, wherein the at least one presence alert message is pre-customized by the user and the at least one contact is pre-selected by the user, the presence alert message also being expressly addressed to the at least one contact from the user, the at least one presence alert message being structured as a chat message having a tag that indicates to the electronic chat client to receive the chat message without initiating a chat session; and
   a database storing contact parameters, the contact parameters including settings defined by the user for sending presence alert messages to contacts on the contact list of the user,
   wherein the electronic chat client is further configured to receive presence alert messages from other users, the electronic chat client configured to present the user an option of responding to a received presence alert message after an audio file of the received presence alert message is played and wherein the electronic chat client is configured to play the audio file contained in the presence alert message without opening a chat window.

2. The system of claim 1, wherein the contact parameters include a plurality of designations of types of network presence changes with regard to the user that cause different presence alert messages to be sent to different identified contacts from the contact list.

3. The system of claim 1, wherein the contact parameters include a plurality of designations of particular contacts that are to receive presence alert messages.

4. The system of claim 1, wherein the contact parameters include a plurality of designations of audio files that are to be sent as presence alert messages for particular network presence changes.

5. The system of claim 4, wherein a particular change in presence of the user characterizes the user's disposition for receiving electronic chat communication from other users.

6. The system of claim 4, wherein the electronic chat client causes an operating system employing the electronic chat client to play a subtle sound in lieu of playing the audio file associated with the presence alert message when another application is in current operation when the presence alert message is received.

7. The system of claim 1, wherein the electronic chat client designates in the contact parameters a location of a particular audio file that is included in the presence alert message for a particular change in network presence status of the user.

8. The system of claim 1, wherein the electronic chat client is configured to generate a request for a contact of the user to be added to a contact list of another user, the electronic chat client further configured to send an audio file to a chat client of the another user such that the chat client of the another user plays the audio file upon receiving a presence alert message from the user.

9. The system of claim 8, wherein the electronic chat client is configured to create the audio file that is included in the presence alert message, the audio file comprising a recording of the user announcing the network presence change.

10. The system of claim 1, wherein the presence alert message is sent from the electronic chat client in addition to presence information that is sent from the electronic chat client to a presence server.

11. A method for relaying presence information within a electronic chat environment, comprising:
    specifying settings defined by a user for sending network presence alert messages to contacts on a contact list of the user;
    detecting a network presence change of the user of an electronic chat client; and
    in response to detection of the network presence change, sending at least one network presence alert message to at least one contact included in the contact list of the user, the contact list utilized in electronic chat communications by the electronic chat client, wherein the network presence alert message is pre-customized by the user and the at least one contact is pre-selected by the user, the alert message also being expressly addressed to the at least one contact from the user, the at least one network presence alert message being structured as a chat message having a tag that indicates to the electronic chat client to receive the chat message without initiating a chat session,
    wherein the electronic chat client is configured to receive presence alert messages from other users, the electronic chat client configured to present the user an option of responding to a received presence alert message after an audio file of the received presence alert message is played and wherein the electronic chat client is configured to play the audio file contained in the presence alert message without opening a chat window.

12. The method of claim 11 further comprising:
    maintaining a plurality of designations of types of network presence changes with regard to the user that cause different network presence alert messages to be sent to different identified contacts from the contact list.

13. The method of claim 11 further comprising:
    maintaining a plurality of designations of particular contacts that are to be sent network presence alert messages.

14. The method of claim 11, further comprising:
    designating a contact that is to receive a network presence alert message by identifying a communication address where the network presence alert message is to be sent for a particular change in network presence status of the user, wherein the particular change in network presence status characterizes the user's disposition for receiving communication from other users of a communications network.

15. The method of claim 11, wherein the designations include a plurality of designations of audio files that are to be sent as network presence alert messages for particular network presence changes.

16. The method of claim 15, further comprising:
creating an audio file that is to be sent as a network presence alert message, the audio file comprising a recording of the user announcing the network presence change.

17. The method of claim 15, further comprising:
prompting the user to designate a particular change in the network presence status of the user that will initiate the sending of a network presence alert message to at least one other user.

18. The method of claim 17, further comprising:
receiving a network presence alert message sent from another user; and
playing an audio file contained in the received network presence alert message without opening a new chat window.

19. The method of claim 17, further comprising:
receiving a network presence alert message sent from another user; and
playing a subtle sound in lieu of an audio file contained in the received network presence alert message if the electronic chat client is not in current use by the user.

20. The method of claim 11, further comprising:
generating a request for the user to be added as a contact to a contact list of another user;
sending an audio file to a chat client of the another user as part of a process of adding the contact of the user to the contact list of the another user; and
playing the audio file upon receiving a network presence alert message from the user.

21. The method of claim 11, wherein the network presence alert message is sent from the electronic chat client in addition to presence information that is sent from the electronic chat client to a presence server.

* * * * *